(12) United States Patent
Beev et al.

(10) Patent No.: US 12,055,282 B2
(45) Date of Patent: Aug. 6, 2024

(54) LIGHTING MODULE FOR A SIDE PORTION OF A VEHICLE

(71) Applicant: VALEO VISION, Bobigny (FR)

(72) Inventors: Kostadin Beev, Bobigny (FR); Jean-Luc Meyrenaud, Bobigny (FR)

(73) Assignee: VALEO VISION, Bobigny (FR)

( * ) Notice: Subject to any disclaimer, the term of this patent is extended or adjusted under 35 U.S.C. 154(b) by 267 days.

(21) Appl. No.: 17/776,975

(22) PCT Filed: Nov. 13, 2020

(86) PCT No.: PCT/EP2020/082071
§ 371 (c)(1),
(2) Date: May 13, 2022

(87) PCT Pub. No.: WO2021/094544
PCT Pub. Date: May 20, 2021

(65) Prior Publication Data
US 2022/0390085 A1    Dec. 8, 2022

(30) Foreign Application Priority Data
Nov. 15, 2019    (FR) ........................................ 1912759

(51) Int. Cl.
*G06V 20/00*    (2022.01)
*B60Q 1/24*    (2006.01)
(Continued)

(52) U.S. Cl.
CPC .............. *F21S 43/31* (2018.01); *B60Q 1/249* (2022.05); *B60Q 1/32* (2013.01); *G06V 10/145* (2022.01);
(Continued)

(58) Field of Classification Search
None
See application file for complete search history.

(56) References Cited

U.S. PATENT DOCUMENTS

| 2008/0122597 A1 | 5/2008 | Englander |
| 2012/0105638 A1 | 5/2012 | Englander |
| 2014/0192196 A1 | 7/2014 | Englander |

FOREIGN PATENT DOCUMENTS

| DE | 10 2018 212 705 A1 | 2/2019 |
| FR | 978 895 | 4/1951 |

(Continued)

OTHER PUBLICATIONS

International Search Report mailed on Dec. 14, 2020 in PCT/EP2020/082071 filed on Nov. 13, 2020 (citing references AA-AC, AO-AT, therein, 2 pages).

*Primary Examiner* — James M McPherson
(74) *Attorney, Agent, or Firm* — Oblon, McClelland, Maier & Neustadt, L.L.P.

(57) ABSTRACT

A lighting device for a motor vehicle includes a housing having a front lighting surface, and a substantially planar plate and at least one lighting module mounted on the plate. The plate has a general plane of extension that is horizontal when the housing is mounted in the vehicle, and has a surface referred to as a lower surface and a surface referred to as an upper surface. The plate includes a first control system which includes a first male element and is arranged to cause translation of the first male element in an axis parallel to the plate, the plate being provided with a first recess receiving the first male element. A second control system that includes a second male element and is arranged to cause translation of the second male element in an axis perpendicular to the plate, the plate being provided with a second recess on its upper or lower surface that receives the second male element. The housing thus takes up less space above the modules, which can easily be raised.

20 Claims, 3 Drawing Sheets

(51) Int. Cl.
  *B60Q 1/32* (2006.01)
  *F21S 43/31* (2018.01)
  *G06V 10/145* (2022.01)
  *G06V 20/58* (2022.01)
  *H04N 23/56* (2023.01)
  *B60W 50/14* (2020.01)
  *B60W 60/00* (2020.01)
  *F21W 102/40* (2018.01)

(52) U.S. Cl.
  CPC ............. *G06V 20/58* (2022.01); *H04N 23/56* (2023.01); *B60W 50/14* (2013.01); *B60W 60/001* (2020.02); *B60W 2420/403* (2013.01); *F21W 2102/40* (2018.01)

(56) References Cited

FOREIGN PATENT DOCUMENTS

| | | |
|---|---|---|
| FR | 1 039 135 | 10/1953 |
| FR | 2 774 743 A1 | 8/1999 |
| JP | 53-67787 | 6/1978 |
| WO | WO 2019/150011 A1 | 8/2019 |

LIGHTING MODULE FOR A SIDE PORTION OF A VEHICLE

The invention relates to an optical device for lighting the lateral regions of a vehicle without introducing any dazzling effect for pedestrians and/or drivers of adjacent vehicles. It also relates to a lighting module, an assistance device and a vehicle as such comprising at least one such optical device.

With the development of autonomous motor vehicles, it is becoming necessary to improve driver assistance under all lighting conditions, especially with a view to managing various particular driving functions, including:

"lane keeping", which function allows a vehicle to follow its lane on a road, especially by detecting any deviation in path and signaling it to the driver;

"lane centering", which function complements the preceding function, and more precisely allows the vehicle to be kept in the center of its lane autonomously, "lane changing", which function allows a vehicle to change lane, for example with a view to overtaking, "autonomous emergency braking" (or more simply AEB), "autonomous emergency steering" (or more simply AES), which function allows an obstacle present in the lane to be avoided, "parking assistance", and "autonomous parking".

In these various functions, the assisting device needs to receive input information, especially including information regarding the detection of ground markings, such as the lines bounding lanes, and/or the presence of any obstacles on the road. This detection must be able to be carried out under all conditions, and especially at night.

It will be noted that existing vehicle lighting allows the road in front of the vehicle to be illuminated from a distance of two meters in the vehicle's own lane, and five meters in adjacent lanes.

However, illuminating the lateral region beside the vehicle is more difficult because the illumination must cover the entirety of a rectangular area adjacent to the vehicle, which area extends from a few centimeters to several meters from the vehicle and over a length of about ten meters. The angular extent of this region to be illuminated makes it very difficult to illuminate this entire area uniformly. On the other hand, it is naturally strongly recommended not to dazzle adjacent vehicles.

These constraints mean that, at the present time, it is difficult, if not impossible, to be able to detect certain ground markings or obstacles in proximity to a vehicle, especially in lateral regions, this preventing provision of an assisting device able to perform the aforementioned functions, which are required by autonomous vehicles.

The aim of the invention is to provide a solution for illuminating a lateral region of a vehicle that remedies the above drawbacks and improves the devices and methods for assisting with driving a motor vehicle, especially allowing it to perform the aforementioned assistance functions, so as to make it suitable for assisting an autonomous vehicle.

In addition, the aim of the invention is to provide a solution for providing illumination and assisting with driving a motor vehicle that is simple and reliable while not generating excessively high extra costs.

To this end, the invention relates to an optical device for a vehicle, characterized in that it comprises a reflecting surface comprising a first section on a vertical longitudinal plane of substantially parabolic shape and a second section, perpendicular to the first, on a vertical transverse plane, of substantially elliptical shape.

All the sections of the reflective surface on a vertical longitudinal plane can have a substantially parabolic shape and/or all the sections of the reflective surface on a vertical transverse plane can have a substantially elliptical shape.

The optical device may comprise a length less than or equal to 45 mm, or even less than or equal to 40 mm, or even less than or equal to 35 mm, and/or may comprise a width less than or equal to 25 mm, or even less than or equal to 20 mm, and/or may comprise a height less than or equal to 15 mm, or even less than or equal to 10 mm.

The optical device for a vehicle may comprise at least one light source arranged at the level of a focal point of the section of substantially elliptical shape of the reflecting surface, in particular a source of white and/or near infrared light, oriented toward the concave part of the reflective surface.

The optical device may comprise an inclination of the axis of its substantially elliptical section of between 10 and 30 degrees relative to a horizontal plane.

The reflecting surface may have an end stop positioned above the axis of the substantially elliptical section, so as to allow the reflection of lighting suitable for illuminating a lateral region of a vehicle without dazzling a neighboring vehicle.

The invention also relates to a lighting module for a motor vehicle, characterized in that it comprises at least one optical device as described previously.

The lighting module can comprise two optical devices as described above, inclined with respect to each other by an angle of between 30 and 50 degrees measured in projection on a horizontal plane.

The lighting module may comprise at least one camera, in particular arranged between two optical devices.

The invention also relates to a driving assistance device, characterized in that it comprises at least one lighting module as described hereinabove in order to illuminate the lateral region of a motor vehicle, in that it comprises moreover at least one camera for viewing said illuminated lateral region, and in that it further comprises a central unit comprising a hardware and/or software device exploiting the data transmitted by said at least one camera to transmit driving assistance data to a vehicle.

The invention also relates to a motor vehicle, in particular an autonomous or semi-autonomous vehicle, characterized in that it comprises one or more optical devices as described previously or one or more lighting modules as described previously, arranged in the lower and lateral part of the motor vehicle or at the level of a rear-view mirror of the vehicle or in that it comprises a driving assistance device as described hereinabove.

Finally, the invention also relates to a method for assisting with the driving of a motor vehicle, characterized in that it comprises the following steps:

Lighting of a lateral region of a vehicle using at least one optical device as described previously or one or more lighting modules as described previously, arranged in the lateral part of the motor vehicle;

Visualization of said illuminated lateral region using at least one camera arranged on the motor vehicle, and transmission of the data visualized by the camera to a central unit of the motor vehicle;

Analysis of said data received by the central unit, in particular detection of obstacles, and deduction of driving assistance instructions;

Transmission of driving assistance data to an autonomous driving device and/or to a human-machine interface of the motor vehicle.

The accompanying drawings show, by way of example, one embodiment of an optical device according to the invention and of a vehicle comprising such a device.

FIG. 1 schematically depicts a perspective view, from above, of an optical device according to one embodiment of the invention.

FIG. 2 schematically depicts a side view, in cross section, of the optical device according to the embodiment of the invention.

FIG. 3 schematically depicts a side view, in cross section, of the operation of the optical device according to the embodiment of the invention.

By convention, the three directions x, y, z will be used hereinafter to describe an optical device in isolation. The direction y will be called the longitudinal direction, the direction x the transverse direction, and the direction z the vertical direction. These directions are chosen in relation to the particular geometry of the optical device, which will be described later. These directions are also linked to a vehicle on which the optical device is capable of being positioned, at the level of a lateral flank in order to proceed with illuminating the lateral region of said motor vehicle, this vehicle itself being positioned on a horizontal plane. In a particular example of implementation, the longitudinal direction y of the optical device corresponds to the direction oriented from the rear to the front of the motor vehicle. The direction x then corresponds to the direction oriented from the left to the right of the vehicle. The direction z corresponds to the vertical direction. The directions x, y, z are thus also defined in an extended manner with respect to a motor vehicle, in a configuration of particular alignment of the optical device with the vehicle.

The optical device 1 according to the embodiment comprises a reflective surface intended to reflect the light coming from at least one light source 10, arranged to emit light toward this reflective surface. According to the embodiment of the invention, this optical device 1 is designed to allow the illumination of the lateral region of a motor vehicle, close to a motor vehicle, to respect the targeted lighting region mentioned above, without light pollution for other vehicles.

Figure 1:
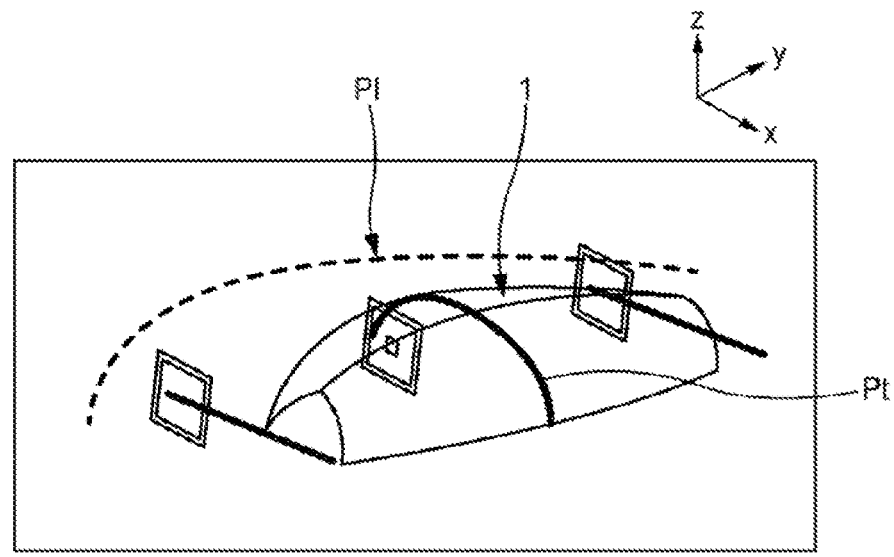

According to the embodiment, the reflective surface of the optical device 1 has a particular shape, intended for use within a motor vehicle according to the orientation shown in FIG. 1. It has a section of substantially parabolic shape (a portion of a parabola) in section on a longitudinal-vertical plane Pl yz. The longitudinal direction is intended for alignment with the longitudinal direction (rear to front) of a motor vehicle, or alternatively with an inclination with respect to this longitudinal direction of a vehicle. In all cases, this shape allows a good distribution of the light rays reflected along the longitudinal direction y, and in particular in general a good distribution of the lighting along the longitudinal direction y of a motor vehicle. In the illustrated embodiment, all the sections of the reflective surface on parallel longitudinal-vertical planes have a parabolic shape. As a variant, only part of these sections, over at least half, or even two thirds, of the surface, could have such a shape.

On the other hand, the reflective surface of the optical device 1 has a section of substantially elliptical shape (a portion of an ellipse) in section on a transverse-vertical plane Pt xz. This shape allows a good transverse distribution of the reflected light rays. As a variant, only part of these sections, over at least half, or even two thirds, of the surface, could have such a shape.

As a side note, the above considerations apply assuming that the optical device is intended for alignment with the longitudinal direction y of a motor vehicle. This same optical device could, however, be inclined with respect to this longitudinal direction, as will be detailed below.

Figure 2:
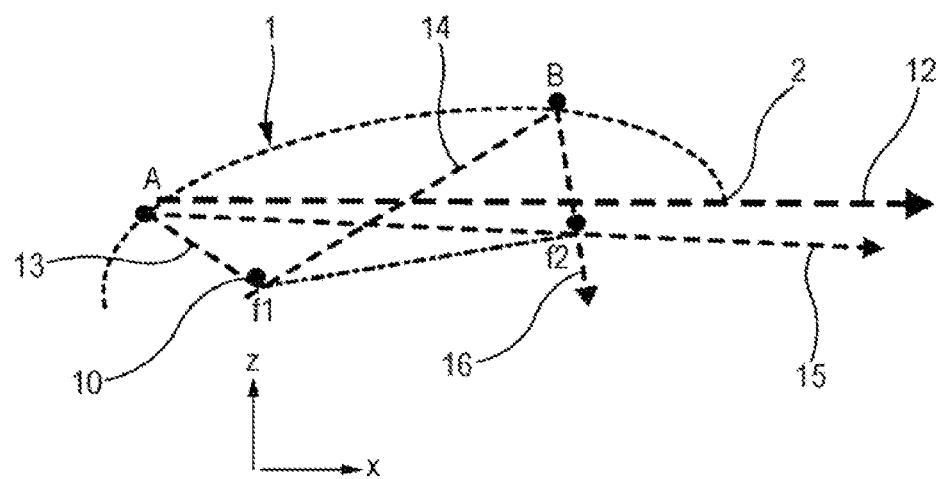
Figure 3:
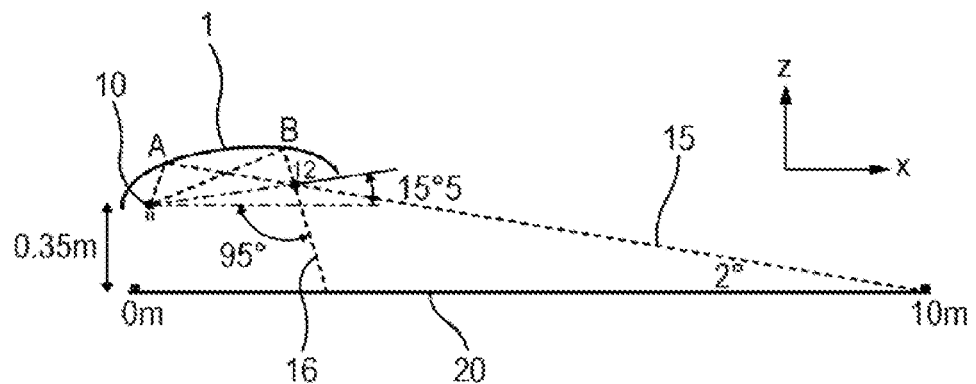

FIGS. 2 and 3 more precisely illustrate the operation of such a lighting device in a transverse-vertical plane Pt. In such a plane, the reflecting surface of the optical device 1 therefore comprises an elliptical shape with foci f1 and f2. Its concavity is substantially oriented downward, that is to say toward the ground, so as to reflect the light rays toward the ground, close to the vehicle, and according to a predefined maximum range in the transverse direction x so as to illuminate the region useful for the proper functioning of an autonomous vehicle, as mentioned above.

On the other hand, the optical device 1 comprises a light source 10 substantially positioned at the level of the focus f1 of the reflecting surface. This light source 10 emits light in a cone of light delimited by two incident light rays 13, 14, oriented respectively toward two points A, B of the reflecting surface. The latter returns a cone of light toward the ground, delimited respectively by two reflected light rays 15, 16, corresponding respectively to the incident rays 13, 14.

The light source 10 may include a light emitting diode. To simplify the description, only a single light source will be considered to be present below, even though in practice said light source could be formed by combining a plurality of separate light sources. This light source can emit any light, for example white and/or near infrared light.

The reflective surface further comprises an edge 2, intended for positioning on the exterior side of the vehicle. This edge forms a stop for the reflected rays. Indeed, as schematically illustrated in FIG. 2, this edge 2 is capable of blocking any ray that would be reflected above the ray 12 shown. It therefore provides the optical device with a safety feature, guaranteeing that no ray of light will be emitted beyond a certain height which would risk dazzling neighboring vehicles.

In an embodiment that is not shown, the surface of the reflector could be extended from the edge 2 to the intersection with the ray 15 so as to laterally mask the illuminated surface. This would make it possible to reduce lateral glare as much as possible while maintaining efficient ground lighting.

FIG. 3 more precisely represents the operation of the optical device according to the embodiment in a particular example of implementation. In this example, the reflective surface is oriented such that it is inclined at an angle with respect to a horizontal plane, such that the f1-f2 axis of its elliptical section is inclined at an angle of approximately 15 degrees with respect to such a horizontal plane, the aperture being open toward the lateral side that is to be illuminated. Moreover, the distance between the two foci of the ellipse is about 25 mm. In addition, the optical device has a length of approximately 40 mm, measured in the longitudinal direction y, and a height of approximately 10 mm, measured in the vertical direction z. The optical device thus has a small dimension which advantageously allows it to be easily and flexibly positioned on a motor vehicle. On the other hand, the optical device is positioned on a sill of a motor vehicle, at a height of about 35 cm from the ground. With such parameters, it appears that the reflective surface of the optical device emits a first ray of light 16 that is substantially vertical, presenting an inclination of 95 degrees relative to the horizontal direction. In addition, it emits a second ray of light 15 which reaches the ground at a distance of approximately 10 m from the vehicle (in the transverse direction x of the optical device, which may or may not coincide with the transverse direction of the vehicle, depending on the arrangement chosen for the optical device within the motor vehicle). The optical device 1 according to the embodiment thus makes it possible to achieve satisfactory lateral illumination for a motor vehicle.

Figure 4:
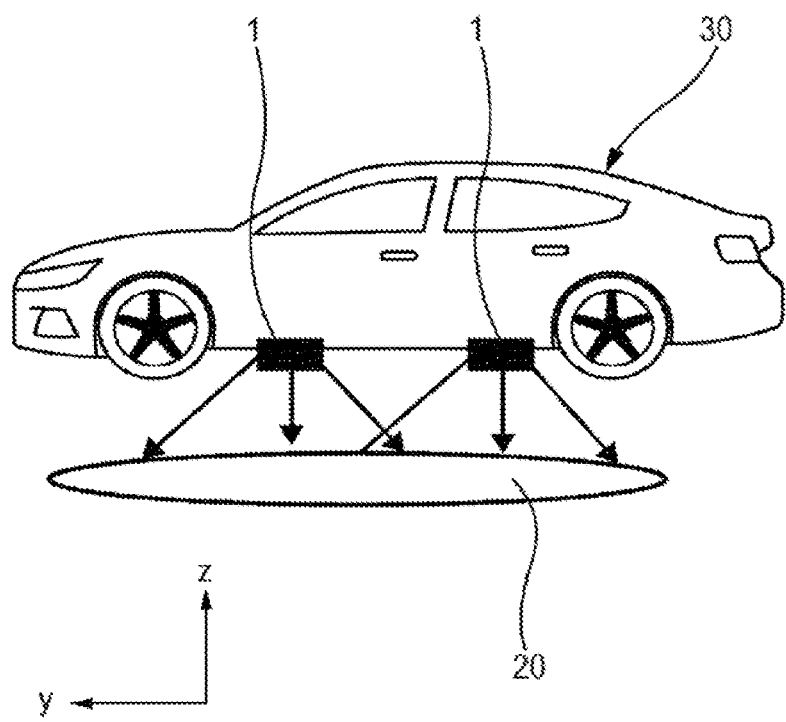
FIG. 4 depicts a side view of a vehicle equipped with optical devices according to the embodiment of the invention.

FIG. 4 thus illustrates a motor vehicle integrating two lighting modules arranged in the lower part of its body, on its side. Each lighting module comprises an optical device 1 according to the embodiment of the invention. Such an optical device 1 can be positioned so that its longitudinal direction coincides with the longitudinal direction of the motor vehicle. As a variant, each lighting module could comprise several optical devices, as will for example be described below with reference to FIG. 5. Naturally, such light modules are provided on both sides of the vehicle. In addition, these lighting modules are arranged in a distributed manner over the length of the motor vehicle. They are for example positioned substantially at respectively one third and at two thirds of the length of the motor vehicle. They are positioned between the two wheels of the vehicle. By this arrangement, the lighting modules make it possible to form an illuminated lateral region 20 as desired, that is to say a region sufficient for satisfactory illumination of the lateral region of a motor vehicle, compatible with autonomous driving of such a vehicle. These lighting modules are therefore designed to cooperate with at least one camera arranged on a motor vehicle, making it possible to view said illuminated lateral region 20. Naturally, as a variant, the lighting modules according to the invention could be arranged differently on the side of a motor vehicle. They could be arranged at any level of the body of the vehicle, or on a rear-view mirror. The inclination and the geometric parameters of the optical device(s) of the lighting modules will be adapted to achieve a result similar to that shown in FIG. 3.

Figure 5:
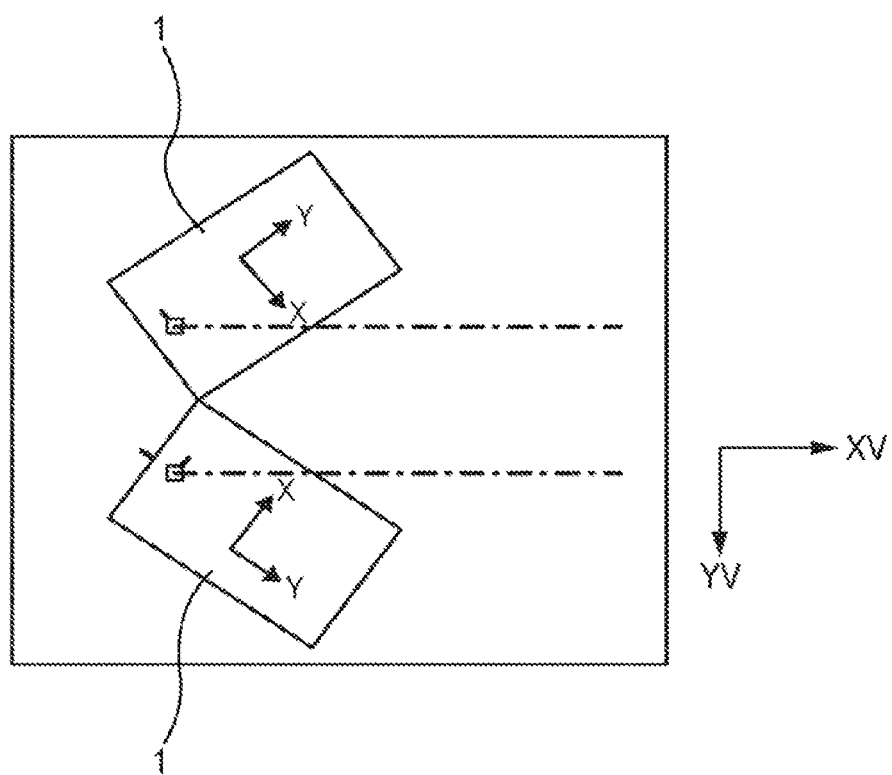
FIG. 5 depicts a side view of a lighting module comprising two optical devices according to the embodiment of the invention.

As mentioned above, a lighting module according to the invention can integrate several optical devices as described above. Thus, FIG. 5 illustrates by way of example a lighting module comprising two identical optical devices 1, whose longitudinal directions y as described are oriented at an angle of 40 degrees. Each optical device has a longitudinal direction y oriented at 20 degrees with respect to the transverse direction xv of a vehicle. The two optical devices are symmetrically distributed with respect to this transverse direction xv of the vehicle. These orientations are measured in a horizontal plane. This arrangement allows good complementarity of the two optical devices, the complementary lighting from which makes it possible to achieve lighting that is uniform and of the desired level. Alternatively, the two optical devices could be inclined with respect to each other by an angle of between 30 and 50 degrees in a horizontal plane. It thus emerges that the optical device 1 may therefore not be aligned with the longitudinal direction yv (of the motor vehicle), so that the f1-f2 axis of its elliptical section, projected in a horizontal plane, may be inclined with respect to the transverse direction xv of the vehicle.

On the other hand, according to an advantageous embodiment, a camera can be integrated into a lighting module according to the invention. For example, a camera can be positioned between two optical devices 1 of a lighting module.

The optical device can be made of any material. It may in particular comprise any material making it possible to form a reflective surface. For example, it may be in a plastic material whose reflective surface is metalized.

Naturally, the invention is not limited to the embodiment described. In particular, the reflective surface may have different variants. It comprises at least a first section having the shape of a parabola arc or substantially a parabola arc. It may comprise two parts distributed about a vertical longitudinal plane Pl each comprising parabolic sections whose parabolas are not necessarily identical. It further comprises at least a second section perpendicular to the first section, having the shape of an arc of an ellipse or substantially an arc of an ellipse. It advantageously comprises a length less than or equal to 45 mm, or even less than or equal to 40 mm, or even less than or equal to 35 mm. It advantageously comprises a width less than or equal to 25 mm, or even less than or equal to 20 mm. It advantageously comprises a height less than or equal to 15 mm, or even less than or equal to 10 mm. The reflective surface further comprises an inclination relative to a horizontal plane such that the axis of its substantially elliptical section has an inclination of between 10 and 30 degrees relative to a horizontal plane.

The invention also relates to a lighting module intended to be mounted on the sill of a vehicle, especially a motor vehicle, comprising a plurality of optical devices 1 as described above.

The invention also relates to a driving assistance device, comprising at least one lighting module comprising at least one such optical device, in order to illuminate the lateral region of a motor vehicle. This assistance device further comprises at least one camera for viewing said illuminated lateral region. It further comprises a central unit, which may be a computer comprising a hardware and/or software device making it possible to exploit the data transmitted by said at least one camera, in order to analyze said data in order to transmit driving assistance data to a vehicle. This assistance device thus fulfills the functions of "lane keeping", and/or of "lane centering", and/or of "lane changing", and/or of "autonomous emergency braking", and/or of "autonomous emergency steering", and/or parking assistance, and/or autonomous parking, as mentioned at the beginning of the description.

The invention also relates to a method for assisting with the driving of a motor vehicle, comprising the following steps:

lighting of a lateral region of a vehicle using at least one optical device or a lighting module as described above;

visualization of said illuminated lateral region using at least one camera, and transmission of the data visualized from the camera to a central unit;

analysis of the data received from the camera by the central unit, in particular detection of obstacles, and deduction of driving assistance instructions;

transmission of driving assistance data to an autonomous driving device and/or to a human-machine interface of the vehicle.

The invention finally relates to a motor vehicle, preferably an autonomous vehicle, comprising one or more optical devices or lighting modules or an assistance device as described above and arranged in the side part of the motor vehicle.

The invention claimed is:

1. An optical device for a vehicle, comprising a reflecting surface with a first section by a vertical longitudinal plane of substantially parabolic shape and a second section, perpendicular to the first, on a vertical transverse plane, of substantially elliptical shape, wherein at least a part of the sections of the reflecting surface on a vertical longitudinal plane has a substantially parabolic shape and/or in that at least a part of the sections of the reflecting surface on a vertical transverse plane has a substantially elliptical shape and in that it comprises at least one light source arranged at the level of a focal point of one of said sections of substantially elliptical shape of the reflecting surface.

2. The optical device for a vehicle as claimed in claim 1, wherein half of the sections, or two thirds of the sections, or all the sections of the reflecting surface on a vertical longitudinal plane have a substantially parabolic shape and/or half of the sections, or two thirds of the sections, or all the sections of the reflecting surface on a vertical transverse plane have a substantially elliptical shape.

3. The optical device for a vehicle as claimed in claim 1, wherein the optical device comprises a length less than or equal to 45 mm, or even less than or equal to 40 mm, even less than or equal to 35 mm, and/or the optical device comprises a width less than or equal to 25 mm, or even less than or equal to 20 mm, and/or the optical device comprises a height less than or equal to 15 mm, even less than or equal to 10 mm.

4. The optical device for a vehicle as claimed in claim 1, wherein the light source is a source of white and/or near infrared light.

5. The optical device for a vehicle as claimed in claim 4, wherein it comprises an inclination of the axis of its substantially elliptical section of between 10 and 30 degrees relative to a horizontal plane.

6. The optical device for a vehicle as claimed in claim 5, wherein the reflecting surface has an end stop positioned above the axis of the substantially elliptical section, so as to allow the reflection of lighting suitable for illuminating a lateral region of a vehicle without dazzling a neighboring vehicle.

7. A lighting module for a motor vehicle, wherein the motor vehicle comprises at least one optical device as claimed in claim 1.

8. The lighting module as claimed in claim 7, wherein the lighting module comprises two of said optical devices inclined with respect to each other by an angle of between 30 and 50 degrees measured in projection on a horizontal plane.

9. The lighting module as claimed in claim 7, wherein the lighting module comprises at least one camera, in particular arranged between two optical devices.

10. A driving assistance device, comprising at least one lighting module as claimed in claim 7 in order to illuminate the lateral region of a motor vehicle, wherein the driving assistance device comprises at least one camera for viewing said illuminated lateral region, and the driving assistance device comprises a central unit comprising a hardware and/or software device exploiting the data transmitted by said at least one camera to transmit driving assistance data to a vehicle.

11. A motor vehicle, in particular an autonomous or semi-autonomous vehicle comprising one or more optical devices as claimed in claim 1, arranged in the lower and lateral part of the motor vehicle or at the level of a rear-view mirror of the vehicle.

12. A method for assisting with the driving of a motor vehicle, comprising the following steps:

Lighting of a lateral region of a vehicle using at least one optical device as claimed in claim 1, arranged in the lateral part of the motor vehicle;

Visualization of said illuminated lateral region using at least one camera arranged on the motor vehicle, and transmission of the data visualized by the camera to a central unit of the motor vehicle;

Analysis of said data received by the central unit, in particular detection of obstacles, and deduction of driving assistance instructions;

Transmission of driving assistance data to an autonomous driving device and/or to a human-machine interface of the motor vehicle.

13. The optical device for a vehicle as claimed in claim 2, wherein the optical device comprises a length less than or equal to 45 mm, or even less than or equal to 40 mm, even less than or equal to 35 mm, and/or the optical device comprises a width less than or equal to 25 mm, or even less than or equal to 20 mm, and/or or the optical device comprises a height less than or equal to 15 mm, even less than or equal to 10 mm.

14. The optical device for a vehicle as claimed in claim 2, wherein the light source is a source of white and/or near infrared light.

15. A lighting module for a motor vehicle, wherein the motor vehicle comprises at least one optical device as claimed in claim 2.

16. The lighting module as claimed in claim 8, wherein the lighting module comprises at least one camera, in particular arranged between two optical devices.

17. A driving assistance device comprising at least one lighting module as claimed in claim 8 in order to illuminate the lateral region of a motor vehicle, wherein the driving assistance device comprises at least one camera for viewing said illuminated lateral region, and the driving assistance device comprises a central unit comprising a hardware and/or software device exploiting the data transmitted by said at least one camera to transmit driving assistance data to a vehicle.

18. A motor vehicle, in particular an autonomous or semi-autonomous vehicle comprising one or more optical devices as claimed in claim 2, arranged in the lower and lateral part of the motor vehicle or at the level of a rear-view mirror of the vehicle.

19. A method for assisting with the driving of a motor vehicle, comprising the following steps:

Lighting of a lateral region of a vehicle using at least one optical device as claimed in claim 8, arranged in the lateral part of the motor vehicle;

Visualization of said illuminated lateral region using at least one camera arranged on the motor vehicle, and transmission of the data visualized by the camera to a central unit of the motor vehicle;

Analysis of said data received by the central unit, in particular detection of obstacles, and deduction of driving assistance instructions;

Transmission of driving assistance data to an autonomous driving device and/or to a human-machine interface of the motor vehicle.

20. The optical device for a vehicle as claimed in claim 3, wherein the light source is a source of white and/or near infrared light.

* * * * *